United States Patent
Dahlgren et al.

(10) Patent No.: US 10,876,434 B2
(45) Date of Patent: Dec. 29, 2020

(54) METHOD AND SYSTEM FOR CAMSHAFT POSITIONING CALIBRATION

(71) Applicant: Volvo Car Corporation, Gothenburg (SE)

(72) Inventors: Jan Dahlgren, Torslanda (SE); Stefan Dunert, Saro (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/408,530

(22) Filed: May 10, 2019

(65) Prior Publication Data
US 2019/0368384 A1  Dec. 5, 2019

(30) Foreign Application Priority Data

Jun. 4, 2018 (EP) .................................. 18175735

(51) Int. Cl.
*F01L 1/344* (2006.01)
*F01L 1/047* (2006.01)

(52) U.S. Cl.
CPC ............ *F01L 1/047* (2013.01); *F01L 1/344* (2013.01); *B23P 2700/02* (2013.01)

(58) Field of Classification Search
CPC ............... B23P 2700/02; F01L 1/053; F01L 2001/0537; F01L 1/344; F01L 2013/111; F01L 2013/115; F01L 2103/02; F01L 2800/09; F01L 2800/14; F01L 2800/17; F01L 2820/041; F01L 2820/043; F02D 41/2432
USPC ................................ 123/90.16, 90.17, 90.31
See application file for complete search history.

(56) References Cited

U.S. PATENT DOCUMENTS

| | | | | |
|---|---|---|---|---|
| 5,590,632 A | * | 1/1997 | Kato | F01L 1/34 123/480 |
| 6,463,912 B1 | * | 10/2002 | Fuwa | F01L 1/34 123/478 |
| 2009/0049897 A1 | | 2/2009 | Olin et al. | |
| 2012/0116646 A1 | * | 5/2012 | Lee | F01L 1/3442 701/102 |
| 2015/0040878 A1 | | 2/2015 | Yoshioka | |
| 2016/0084150 A1 | * | 3/2016 | Kawabe | F02D 41/3094 123/294 |
| 2017/0248093 A1 | | 8/2017 | Meldrum et al. | |

(Continued)

FOREIGN PATENT DOCUMENTS

DE  102016219584 A1  4/2018

OTHER PUBLICATIONS

Dec. 5, 2018 European Search Report issue on International Application No. EP18175735.2.

*Primary Examiner* — Jorge L Leon, Jr.
(74) *Attorney, Agent, or Firm* — Clements Bernard Walker; Christopher L. Bernard (57) ABSTRACT

A method for generating a camshaft signature for camshaft positioning calibration for a camshaft included in a combustion engine. The camshaft is adapted to cause a valve to open and close an opening to a cylinder volume of the combustion engine. The combustion engine further includes an intake surge tank adapted for receiving air from the outside environment. The intake surge tank is in fluid connection with the cylinder volume of the combustion engine for providing air for mixing with fuel injected into the cylinder.

6 Claims, 7 Drawing Sheets

(56) References Cited

U.S. PATENT DOCUMENTS

2017/0335779 A1* 11/2017 Hotta .................. F02D 41/10
2018/0051598 A1* 2/2018 Pedro .................. B60K 6/48

* cited by examiner

METHOD AND SYSTEM FOR CAMSHAFT POSITIONING CALIBRATION

CROSS-REFERENCE TO RELATED APPLICATION

The present disclosure claims the benefit of priority of co-pending European Patent Application No. 18175735.2, filed on Jun. 4, 2018, and entitled "A METHOD AND SYSTEM FOR CAMSHAFT POSITIONING CALIBRATION," the contents of which are incorporated in full by reference herein for all purposes.

TECHNICAL FIELD

The present invention relates to methods for camshaft positioning calibration and to a corresponding camshaft positioning system.

BACKGROUND

Camshafts are common in combustion engines for controlling various valves in the combustion engines. A camshaft includes a shaft and at least one, often several, cams arranged on the shaft. As the shaft rotates, the cam moves around the rotation axis of the shaft and causes the valve to open or close depending on the rotational position of the camshaft.

By careful design and accurate positioning of the camshaft it is possible to achieve high accuracy timing control of the valve. One valve is typically arranged to control the flow of an air/fuel mixture into the cylinder of the combustion engine, and another valve to control the release of exhaust gases from the cylinder. A crankshaft controls the stroke of a piston in the cylinder according to a combustion cycle of the engine. Consequently, it is of high importance that the timing relationship between the crankshaft and the camshafts is accurate. Poor timing of the camshaft results in a higher fuel consumption and an increase in exhaust gases released in the environment.

Furthermore, although in the production of vehicles the timing of the camshafts is calibrated, it difficult to restore the originally calibrated camshaft positioning in an accurate way.

Accordingly, there is a need for improved camshaft positioning calibration.

SUMMARY

In view of above, it is an object of the present invention to provide improved camshaft positioning calibration that allows for camshaft positioning calibration of individual camshafts.

According to a first aspect of the invention, there is provided a method for generating a camshaft signature for camshaft positioning calibration for a camshaft included in a combustion engine, the camshaft is adapted to cause a valve to open and close an opening to a cylinder volume of the combustion engine, the combustion engine further includes an intake surge tank adapted for receiving air from the outside environment, the intake surge tank is in fluid connection with the cylinder volume of the combustion engine for providing air for mixing with fuel injected into the cylinder, wherein the method includes: operating the combustion engine at a predetermined rotation speed; providing a constant gas flow into the intake surge tank; measuring a set of camshaft positions and a corresponding set of pressure values indicative of the pressure in the intake surge tank while the camshaft is rotated and the gas flow into the intake surge tank is maintained constant; and providing a camshaft signature including the set of camshaft positions and the corresponding set of pressure values.

The present invention is based on the realization that the camshaft position is related to the pressure in the intake surge tank. The camshaft position is directly related to the valve position, in other words, to what degree the valve is open.

When the valves open or close the opening to the cylinder volume, the fluid connection between the intake surge tank and the cylinder volume is varied whereby also the measurable pressure in the intake surge tank varies. Consequently, it is possible to relate the position of the camshaft to the measurable pressure in the intake surge tank. In this way, the camshaft signature provides a "fingerprint" for an individual camshaft. Thus, the camshaft signature may be considered unique for that specific camshaft in its engine.

The camshaft signature may be stored in a memory and used for subsequent positioning of the camshaft.

The gas flow into the intake surge tank is maintained constant so that the measurable pressure variation in the intake surge tank is caused by the opening or closing of the valve by the rotation of the camshaft.

The rotation of the camshaft is performed in a controlled manner (i.e. at a controlled speed) such that the positions of the camshaft may be measured.

The positions of the camshaft refer to rotational positions of the camshaft with respect to a pre-defined reference position. The rotational positions may be provided as a relative rotation angle from the reference position.

The pressure values may be provided as pressure difference values relative the pressure at the pre-defined reference position of the camshaft. The pre-defined position of the camshaft may be defined as zero degrees rotational angle.

The predetermined rotation speed may be set by specifying an engine RPM (revolutions per minute). The rotation speed of the vehicle is maintained constant such that an operating temperature of the engine may be ensured to be relatively constant during the generation of a camshaft signature. Maintaining a constant operating temperature reduces the influence of temperature fluctuations on the measured pressure in the intake valve.

In embodiments, the camshaft may be adapted to control one of an air intake control valve and an exhaust outlet control valve of the combustion engine.

The camshaft signature may also include timing relationships between the set of camshaft positions and set of pressure values. In other words, the camshaft signature may include correlated time series of camshaft positions and pressure values in order to provide a more accurate camshaft signature.

According to embodiments, the method may include operating the combustion engine at a further predetermined rotation speed; measuring a further set of camshaft positions and a further corresponding set of pressure values indicative of the pressure in the intake surge tank while the camshaft is rotated and the gas flow into the intake surge tank is maintained constant; and providing a camshaft signature including the set of camshaft positions and the corresponding set of pressure values for the further rotation speeds of the combustion engine.

Accordingly, the camshaft signature may advantageously include camshaft positions and pressure values measured at more than one rotation speed of the engine. The camshaft signature may in such case be considered to include of a set of partial camshaft signatures such as a first partial camshaft signature at a first rotation speed and a second partial camshaft signature at a second rotation speed.

According to embodiments, the combustion engine may include a first camshaft adapted to control an air intake control valve of the combustion engine and a second camshaft adapted to control an exhaust outlet control valve of the combustion engine, the method may include: measuring a set of camshaft positions for the first camshaft and a set of camshaft positions for the second camshaft while the camshafts are being rotated, and a corresponding set of pressure values indicative of the pressure in the intake surge tank while the camshafts are rotated and the gas flow into the intake surge tank is maintained constant; and providing a camshaft signature including the set of camshaft positions and the corresponding set of pressure values. Thus, the camshaft signature may include camshaft positions and pressure values for more than one camshaft which thereby enables to provide a camshaft signature for positioning calibration of more than one camshaft.

In the above case, the camshaft signature may include timing relationships between each of the sets of camshaft positions and the corresponding set of pressure values, and between the sets of camshaft positions.

According to a second aspect of the invention, there is provided a method for calibrating a camshaft position for a camshaft of a combustion engine, the camshaft is adapted to control a valve to open and close an opening to a cylinder volume of the combustion engine, the combustion engine further includes an intake surge tank adapted for receiving air from the outside environment, the intake surge tank is in fluid connection with the cylinder volume of the combustion engine for providing air for mixing with fuel injected into the cylinder, wherein the method includes: retrieving a camshaft signature indicative of a camshaft positioning calibration; operating the combustion engine at a predetermined rotation speed; providing a constant gas flow into the intake surge tank; measuring a set of camshaft positions and a corresponding set of pressure values indicative of the pressure in the intake surge tank while the camshaft is rotated and the gas flow into the intake surge tank is maintained constant; comparing the set of camshaft positions and the corresponding set of pressure values with the camshaft signature, and providing an instruction indicative of the outcome of the comparison.

Accordingly, the present invention is further based on the realization to use the provided camshaft signature for enabling accurate adjustment of a camshaft. The adjustment may be performed subsequent to production of the vehicle, e.g. at a workshop by first retrieving the stored camshaft signature from a memory which may be included in the vehicle or stored on a server.

The camshaft position may be adjusted according to the provided instruction.

For instance, in some embodiments, adjustment may be provided by determining a pressure deviation between at least one pressure value of the camshaft signature and at least one pressure value of the measured set of pressure values for at least one corresponding camshaft position of the set of camshaft positions, and adjusting the camshaft position until the pressure deviation is below a threshold pressure deviation. Thus a relatively straight forward but accurate camshaft position adjustment control is provided by the ability to relate the camshaft position to a pressure deviation. The camshaft position adjustment may be performed while the engine is operative.

The camshaft position may adjusted so that the pressure deviation is minimized. In this way the camshaft position is ensured to be as close as possible to the position indicated by the camshaft signature.

This second aspect of the invention provides similar advantages as discussed above in relation to the previous aspect of the invention.

According to a third aspect of the invention, there is provided a camshaft positioning system for camshaft positioning of a camshaft included in a combustion engine, the camshaft is adapted to cause a valve to open and close an opening to a cylinder volume of the combustion engine, the combustion engine further includes an intake surge tank adapted for receiving air from the outside environment, the intake surge tank is in fluid connection with the cylinder volume of the combustion engine for providing air for mixing with fuel injected into the cylinder, the system includes a control unit configured to: control the combustion engine to operate at a predetermined rotation speed; control an inflow valve to provide a constant gas flow into the intake surge tank; measure a set of camshaft positions and a corresponding set of pressure values indicative of the pressure in the intake surge tank while the camshaft is rotated and the gas flow into the intake surge tank is maintained constant; and provide a camshaft signature including the set of camshaft positions and the corresponding set of pressure values.

In embodiments, the control unit may be configured to perform a camshaft calibration procedure including: retrieving a camshaft signature indicative of a camshaft positioning calibration; operating the combustion engine at a predetermined rotation speed and operation temperature; providing a constant gas flow into the intake surge tank; measuring a set of camshaft positions and a corresponding set of pressure values indicative of the pressure in the intake surge tank while the camshaft is rotated and the gas flow into the intake surge tank is maintained constant; comparing the set of camshaft positions and the corresponding set of pressure values with the camshaft signature, and providing an instruction indicative of the outcome of the comparison.

The system may include a memory for storing the camshaft signature.

The combustion engine may be configured to provide propulsion for a vehicle.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DESCRIPTION OF EMBODIMENTS

In the present detailed description, various embodiments of the system and method according to the present invention are described. However, this invention may generally be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1:
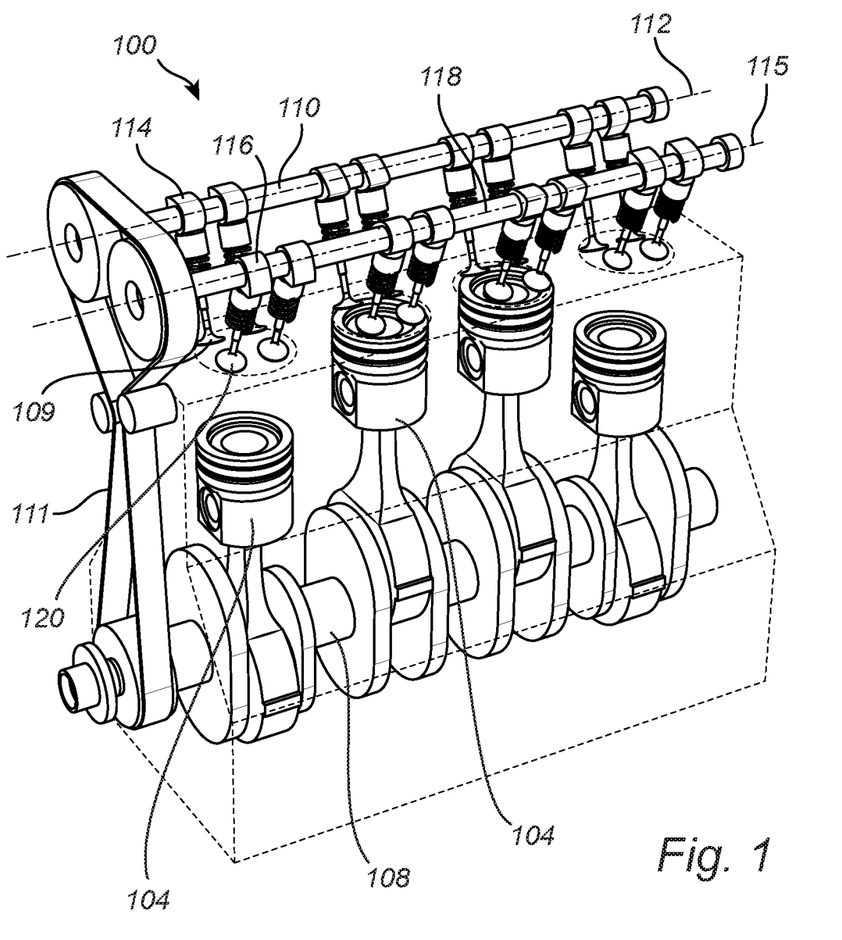
FIG. 1 conceptually illustrates a combustion engine with a crankshaft and camshafts.

FIG. 1 conceptually illustrates an exemplary combustion engine 100 for a vehicle. The combustion engine includes multiple cylinders (not shown) and multiple pistons 104. In each of the cylinder is a respective piston 104 arranged. The pistons 104 are forced to move in the respective cylinder by the ignition of fuel in the cylinder volume. The stroke motion of the piston in the cylinder is transferred to a crankshaft 108 for transferring propulsion power to the driveline (not shown) of the vehicle including the combustion engine 100.

Further, in order to allow air to mix with the fuel in the cylinder volume a valve 109 (only one of several valves is numbered) is configured to open an air inlet to the cylinder volume at timed intervals. The timing is provided by a linking mechanism 111 (a so-called "timing belt") which is configured to rotate a first camshaft 110 about a rotation axis 112 such that a cam 114 of the camshaft 110 causes the first valve 109 to open and close in a synchronized manner with respect to the rotation of the crankshaft and thereby with respect to the strokes of the piston 104.

Furthermore, a second camshaft 118 is configured to open and close a second valve 120 (only one is numbered). The timing of the operation of the second valve 120 is also is provided by the linking mechanism 111. Thus, the linking mechanism is configured to rotate the second camshaft 118 about a rotation axis 115 such that a cam 116 of the second camshaft 118 causes the second valve 120 to open and close in a synchronized manner with respect to the rotation of the crankshaft 108 and thereby with respect to the strokes of the piston 104.

The second valve 120 controls the outflow of exhaust from the cylinder volume in a synchronized manner with the rotation of the crankshaft 108 and thereby with respect to the strokes of the piston 104. The timing relationship between the opening and closing of the valves 109 and 120 will be described further below.

Figure 2:
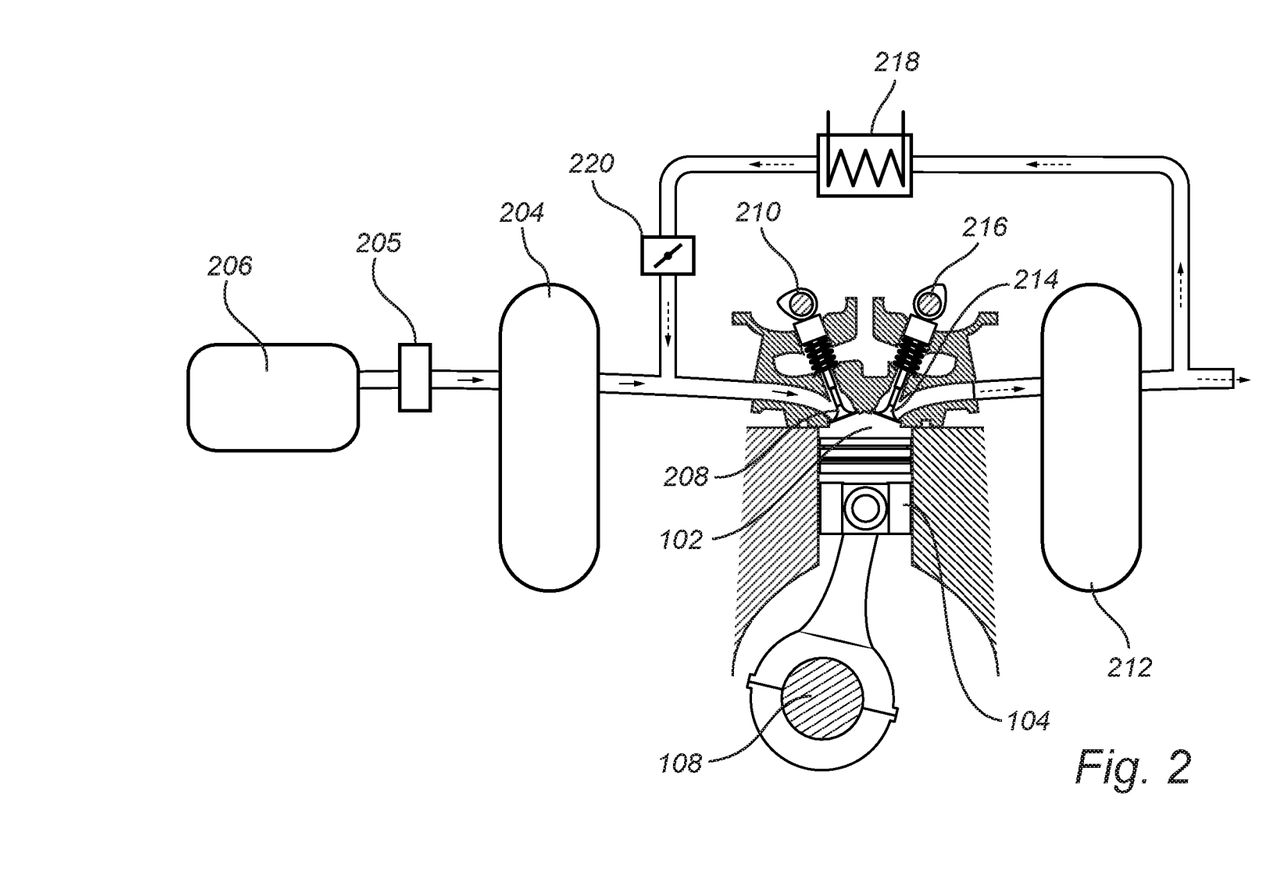
FIG. 2 schematically illustrates embodiments of the invention.

FIG. 2 conceptually illustrates an air intake and exhaust outlet system of a combustion engine. In detail FIG. 2 schematically illustrates an intake surge tank 204 adapted to receive air from the outside environment via a compressor 206 and an air intake gas flow regulator 205 configured to regulate the gas flow into the intake surge tank 204 and to measure the gas flow into the intake surge tank 204. The compressor 206 provides pressurized air to the intake surge tank 204 via the air intake gas flow regulator 205. The compressor 206 may receive air from the outside environment through an intake port (not shown).

Further, pressure sensors (not shown) are arranged to measure the pressure in the intake surge tank 204. The pressure sensor(s) may be a manifold pressure sensor (MAP sensor) located in the intake surge tank 204. Further, is some possible implementations a temperature sensor is arranged to measure the temperature of the air in the intake surge tank 204. This may be advantageous for ensuring that excessively high temperature fluctuations in the intake do not occur.

The intake surge tank 204 is in fluid communication with a cylinder volume 102 via an air intake control valve 208. A cam 210 of a camshaft is adapted to cause the spring loaded valve to open and close via the rotation of the camshaft as described with reference to FIG. 1.

Furthermore, an exhaust surge tank 212 is adapted to receive exhaust gas from the cylinder volume 102 via an exhaust outlet control valve 214. A cam 216 of a second camshaft is adapted to cause the spring loaded valve 216 to open and close via the rotation of the camshaft as described with reference to FIG. 1.

Some of the exhaust gas is circulated back via an exhaust gas recirculation cooler 218 and an exhaust gas recirculation valve 220 to be mixed with air from the intake surge tank 204 before entering the cylinder volume via the air intake control valve 208. Thus, the intake surge tank 204 and the exhaust surge tank 212 have a fluid connection between each other.

The air intake and exhaust outlet system may include further components such as backpressure valves and pressure regulators on the exhaust side of the cylinder. Such components are known per se to the skilled person.

In embodiments of the invention, the airflow into the intake surge tank 204 is provided at a constant gas flow, controlled by the intake gas flow regulator 205, while the combustion engine is operated at a predetermined operation speed (e.g. RPM), at a relatively constant operation temperature.

The camshafts including the respective cams 210 and 216 are rotated and camshaft position sensors measure their positions relative a reference position. The camshaft position is generally given by a rotation angle with respect to the reference position and may be measured by cam sensors (not shown), such cam sensors are known per se to the skilled person and may be implemented by means of inductive sensors sensing a magnet attached to the cam shaft, Hall effect sensors sensing a magnetic field from the magnet, or AC coupled sensor sensing a magnetic field affected by the rotating of the camshaft.

As the camshafts are rotated, the cams 210 and 216 cause a respective valve 208, 214 to open and close a respective opening to the cylinder volume 102. The opening and closing of each valve causes a pressure variation in the intake surge tank 204. The pressure values indicative of the pressure variation is measured simultaneously as the positions of the camshafts are measured.

A camshaft signature includes a set of camshaft positions and a corresponding set of pressure values, for at least one of the camshafts.

A camshaft positioning system for camshaft positioning of a camshaft may thus include a control unit configured to control the combustion engine to operate at a predetermined rotation speed and operation temperature. The control unit may control an intake gas flow regulator 205 to provide a constant gas flow into the intake surge tank 204. The control unit further measures a set of camshaft positions using the cam sensors and a corresponding set of pressure values indicative of the pressure in the intake surge tank using the pressure sensors while the camshaft is rotated and the gas flow into the intake surge tank 204 is maintained constant. The control unit may subsequently provide a camshaft signature including the set of camshaft positions and the corresponding set of pressure values.

Figures 3A, 3B:
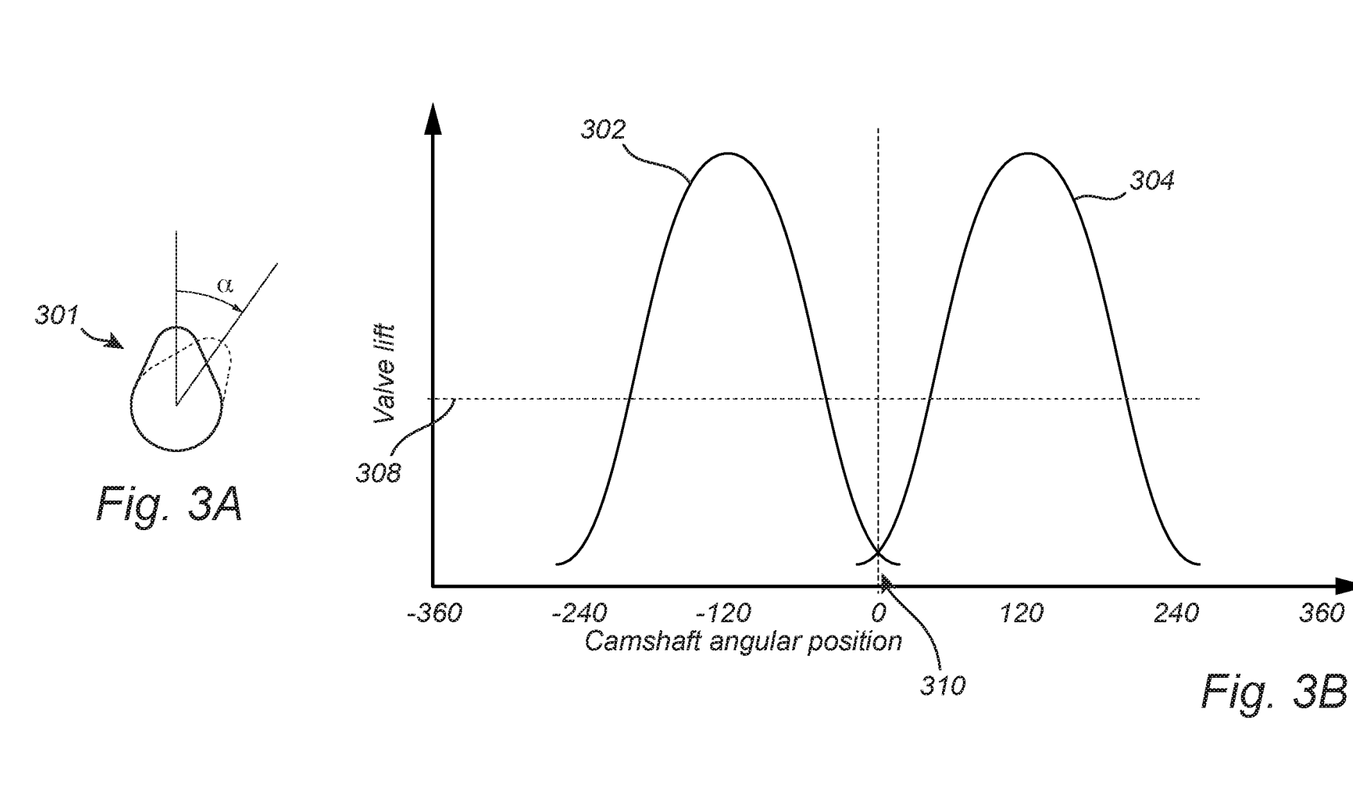
FIG. 3a schematically illustrates a rotational position of a cam.
FIG. 3b schematically illustrates a timing diagram of an air intake cam and an exhaust cam.

FIG. 3a schematically illustrates an exemplary rotational position of a cam 301. The cam 301 has rotated an angle α with respect to a reference position. The rotational angle α may represent a camshaft position. Several reference positions are possible and the reference position shown in FIG. 3a is only shown for exemplary purposes.

FIG. 3b show a cam diagram which describes the angular position of a cam controlling an air intake valve and the angular position of a cam controlling an exhaust valve. Generally, the anatomy of a camshaft includes a cylindrical shaft including cams in the shape of lobes extending transversal to the shaft. The cams are configured to convert the rotary motion of the shaft to a translational motion for controlling the reciprocal motion of a valve. The anatomy of the cam results in motion of the valve which can be described in a diagram as illustrated in FIG. 3B.

The lobe represented by curve 302 describes the valve position for an exhaust valve and the lobe represented by curve 304 describes the valve position for an intake valve, each caused by a respective camshaft rotation. When the cam represented by lobe 302 is at a position such the exhaust valve lift exceeds the level 308 the exhaust valve is fully open to allow the release of exhaust gases from the cylinder volume. Similarly, when the cam represented by lobe 304 is at a position where the intake valve lift exceeds the level 308, then the intake valve is fully open to allow the intake of air into the cylinder volume.

Moreover, the overlap 310 between the lobes 302 and 304 provides for a short time duration where the air intake and exhaust outlet are at least partly open simultaneously. Thus, this is another reason why the opening and closing of each valve causes a pressure variation in the intake surge tank 204.

Accordingly, since the valve motion of the intake valves 210 and exhaust valves 216 is controlled directly or indirectly (via other linking mechanisms) via the anatomy of the cams of the camshafts, the pressure conditions in the intake surge tank 204 will also be affected by the anatomy of the camshaft and the design of any other linking mechanism related to the control of the valves 210 and 216 via the camshaft. The camshafts and the valves, (and other linking mechanisms) are all subject to manufacturing and assembly tolerances which mean that each combustion engine is unique. For this reason, it is possible to generate camshaft signatures when the combustion engine is manufactured and the camshaft positions are initially configured.

Accordingly, a set of pressure values and associated camshaft position values serve as a camshaft signature. Such a camshaft signature may be determined when the vehicle combustion engine is manufactured. The camshaft signature may be stored. At a later time, the camshaft signature may be retrieved and used for re-calibration of the camshafts.

Figure 4A:
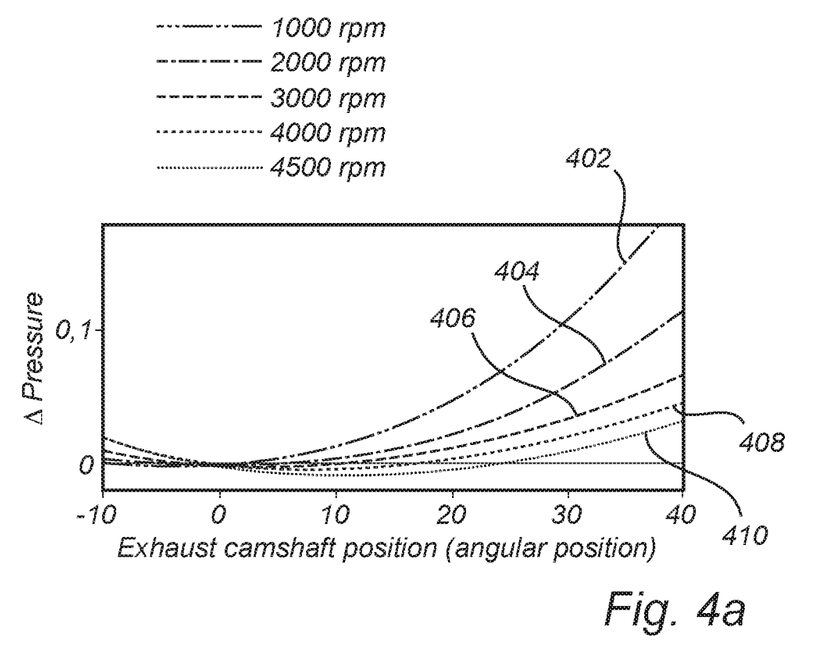
FIG. 4a conceptually illustrates camshaft signatures.
Figure 4B:
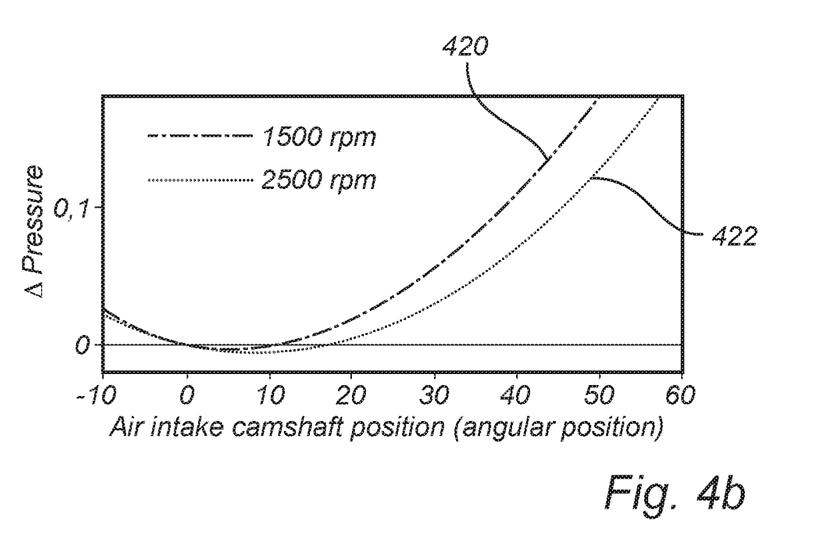
FIG. 4b conceptually illustrates camshaft signatures.

FIG. 4a illustrates a set of camshaft signatures 402, 404, 406, 408, 410 for different rpms of the engine, 1000 rpm, 2000 rpm, 3000 rpm, 4000 rpm, 4500 rpm, respectively, of the combustion engine. The camshaft signatures on FIG. 4a are for illustratively purposes shown for a camshaft responsible for controlling an exhaust control valve (see valve 214 in FIG. 2). The camshaft signatures includes a set of camshaft positions for the camshaft and the corresponding set of pressure values (y-axis) indicative of the pressure difference in the surge intake tank for the respective camshaft position relative to the pressure at zero angular position for the camshaft. In other words, the pressure values are provided as a pressure difference relative to the pressure at the predetermined reference position of the camshaft, i.e. at zero degrees rotational position. FIG. 4b illustrates a further pair of camshaft signatures 420 and 422 for different rpms, 1500 rpm and 2500 rpm, respectively, of the combustion engine. The camshaft signatures on FIG. 4b are for illustratively purposes shown for a camshaft responsible for controlling an air intake control valve (see 208 in FIG. 2). The camshaft signatures includes a set of camshaft positions for the camshaft and the corresponding set of pressure values (y-axis) indicative of the pressure in the surge intake tank for the respective camshaft position relative to the pressure at zero angular position for the camshaft.

Figure 5:
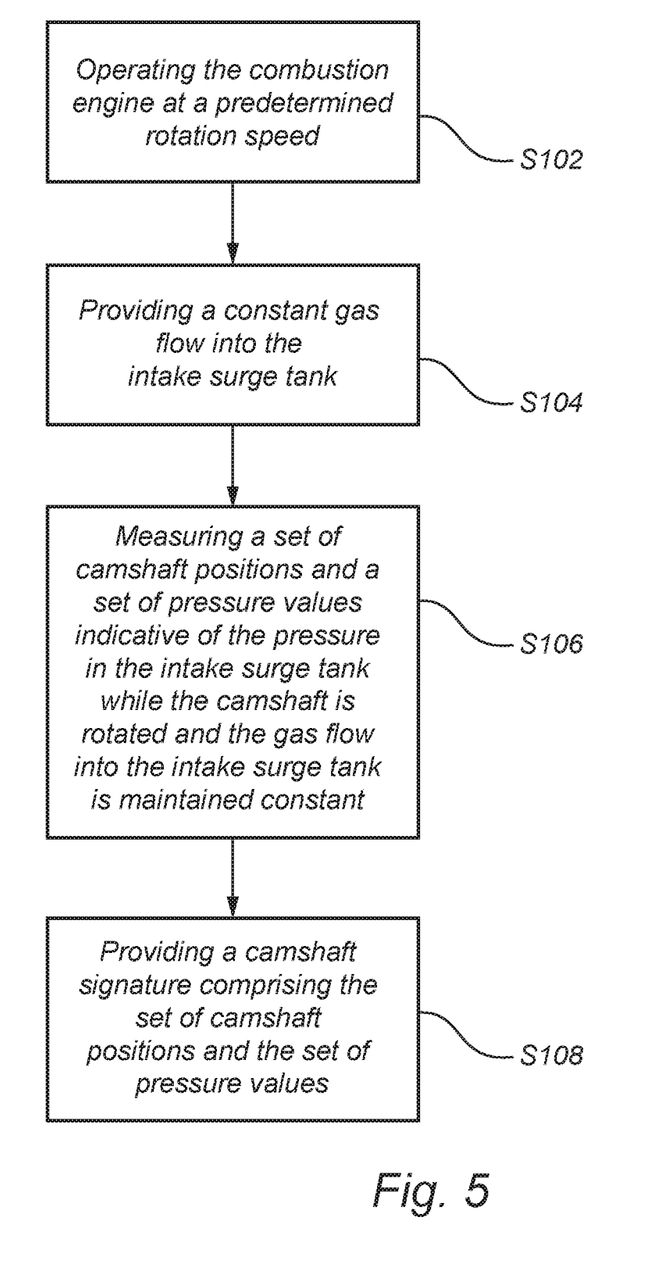
FIG. 5 is a flow chart of method steps according to embodiments of the invention.

FIG. 5 illustrates a flow-chart of method steps according to example embodiments. In a first step S102 the combustion engine is operated at a predetermined rotation speed. Subsequently, in step S104 providing a constant gas flow into the intake surge tank. In step S106, measuring a set of camshaft positions and a corresponding set of pressure values indicative of the pressure in the intake surge tank while the camshaft is rotated and the gas flow into the intake surge tank is maintained constant. A camshaft signature is provided in step S108 including the set of camshaft positions and the corresponding set of pressure values.

Figure 6:
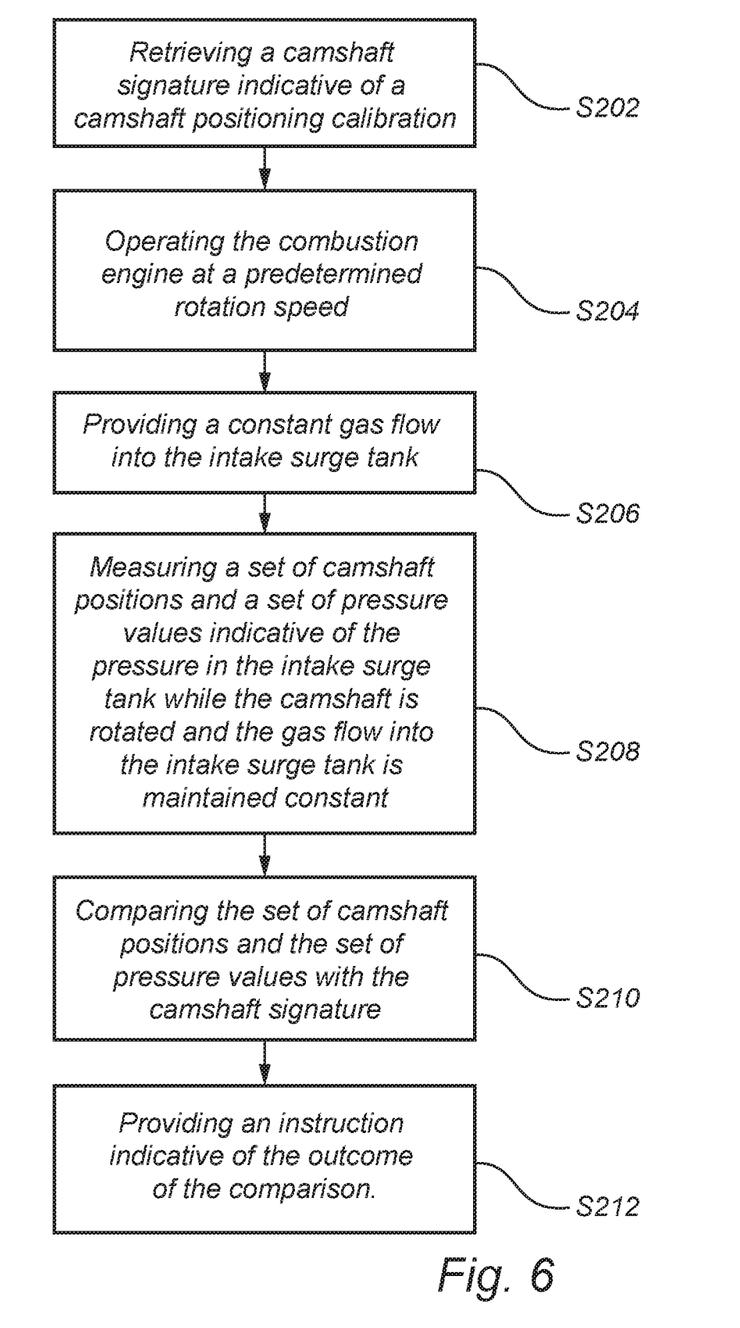
FIG. 6 is a flow chart of method steps according to embodiments of the invention.

FIG. 6 illustrates a flow-chart of method steps according to example embodiments. A camshaft signature indicative of a camshaft positioning calibration is retrieved in step S202. Next, the combustion engine is operated at a predetermined rotation speed in step S204. A constant gas flow is provided into the intake surge tank in step S206. In step S208, measuring a set of camshaft positions and a corresponding set of pressure values indicative of the pressure in the intake surge tank while the camshaft is rotated and the gas flow into the intake surge tank is maintained constant. The set of camshaft positions and the corresponding set of pressure values are compared with the camshaft signature in step S210. An instruction indicative of the outcome of the comparison is provided in step S212.

Figure 7:
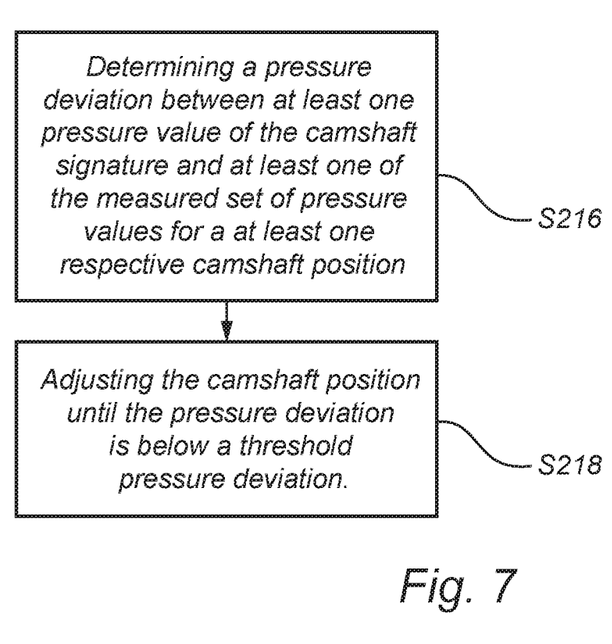
FIG. 7 is a flow chart of additional method steps according to embodiments of the invention.

FIG. 7 illustrates a flow-chart of method steps according to example embodiments. The camshaft position may be adjusted according to the instruction provided in step S212 in FIG. 6. The adjustment may be determined by firstly determining (S216) a pressure deviation between at least one pressure value of the camshaft signature and at least one pressure value of the measured set of pressure values for at least one corresponding camshaft position of the set of camshaft positions. The camshaft position is adjusted in step S218 until the pressure deviation is below a threshold pressure deviation. Preferably, the pressure deviation is minimized.

The adjustment of the camshaft position is performed while the engine is running.

The control functionality of the present disclosure may be implemented using existing computer processors, or by a special purpose computer processor for an appropriate system, incorporated for this or another purpose, or by a hardwire system. Embodiments within the scope of the present disclosure include program products including machine-readable medium for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for recalibrating a camshaft position for a camshaft of a combustion engine, the camshaft is adapted to control a valve to open and close an opening to a cylinder volume of the combustion engine, the combustion engine further comprises an intake surge tank adapted for receiving air from the outside environment, the intake surge tank is in fluid connection with the cylinder volume of the combustion engine for providing air for mixing with fuel injected into a cylinder, wherein the method comprises:
    retrieving a first camshaft signature indicative of a camshaft positioning calibration performed on the camshaft, wherein the first camshaft signature is produced by operating the combustion engine at a predetermined rotation speed, providing a first constant gas flow into the intake surge tank, and measuring a first set of camshaft positions and a first corresponding set of pressure values indicative of a pressure in the intake surge tank while the camshaft is rotated and the first constant gas flow into the intake surge tank is maintained;
    operating the combustion engine at the predetermined rotation speed;
    providing a second constant gas flow into the intake surge tank;
    measuring a second set of camshaft positions of the camshaft and a second corresponding set of pressure values indicative of a pressure in the intake surge tank while the camshaft is rotated and the second constant gas flow into the intake surge tank is maintained;
    providing a second camshaft signature comprising the second set of camshaft positions and the second corresponding set of pressure values; and
    recalibrating the camshaft based on a comparison of the first camshaft signature and the second camshaft signature.

2. The method according to claim 1, wherein the camshaft is adapted to control one of an air intake control valve and an exhaust outlet control valve of the combustion engine.

3. The method according to claim 1, wherein the first camshaft signature comprises timing relationships between the first set of camshaft positions and the corresponding first set of pressure values, wherein the second camshaft signature comprises timing relationships between the second set of camshaft positions and the corresponding second set of pressure values.

4. A camshaft positioning system for camshaft positioning of a camshaft comprised in a combustion engine, the camshaft is adapted to cause a valve to open and close an opening to a cylinder volume of the combustion engine, the combustion engine further comprises an intake surge tank adapted for receiving air from the outside environment, the intake surge tank is in fluid connection with the cylinder volume of the combustion engine for providing air for mixing with fuel injected into a cylinder, the camshaft positioning system comprising a control unit configured to:
    perform a camshaft calibration procedure comprising:
        controlling the combustion engine so as to operate at a predetermined rotation speed;
        controlling an intake gas flow regulator so as to provide a constant gas flow into the intake surge tank;
        measuring a set of camshaft positions and a set of pressure values indicative of a pressure in the intake surge tank while the camshaft is rotated and the constant gas flow into the intake surge tank is maintained;
        providing a camshaft signature comprising the set of camshaft positions and the corresponding set of pressure values;
        storing the camshaft signature in a memory; and
        calibrating the camshaft based on the stored camshaft signature; and
    perform a camshaft recalibration procedure comprising:
        retrieving the camshaft signature;
        controlling the combustion engine to operate at the predetermined rotation speed;
        controlling the intake gas flow regulator to provide a second constant gas flow into the intake surge tank;
        measuring a second set of camshaft positions and a second corresponding set of pressure values indicative of a pressure in the intake surge tank while the camshaft is rotated and the second constant gas flow into the intake surge tank is maintained;
        providing a second camshaft signature comprising the second set of camshaft positions and the second corresponding set of pressure values; and
        recalibrating the camshaft based on a comparison of the camshaft signature and the second camshaft signature.

5. The camshaft positioning system according to claim 4, wherein the combustion engine is configured to provide propulsion for a vehicle.

6. A camshaft positioning system for camshaft positioning of a camshaft comprised in a combustion engine, the camshaft is adapted to cause a valve to open and close an opening to a cylinder volume of the combustion engine, the combustion engine further comprises an intake surge tank adapted for receiving air from the outside environment, the intake surge tank is in fluid connection with the cylinder volume of the combustion engine for providing air for mixing with fuel injected into a cylinder, the camshaft positioning system comprising a control unit configured to:

retrieve, from a memory, a first camshaft signature indicative of a camshaft positioning calibration performed on the camshaft, wherein the first camshaft signature is produced by operating the combustion engine at a predetermined rotation speed, providing a first constant gas flow into the intake surge tank, and measuring a first set of camshaft positions and a first corresponding set of pressure values indicative of a pressure in the intake surge tank while the camshaft is rotated and the first constant gas flow into the intake surge tank is maintained;

operate the combustion engine at the predetermined rotation speed;

control an intake gas flow regulator so as to provide a second constant gas flow into the intake surge tank;

measure a second set of camshaft positions of the camshaft and a second corresponding set of pressure values indicative of a pressure in the intake surge tank while the camshaft is rotated and the second constant gas flow into the intake surge tank is maintained;

provide a second camshaft signature comprising the second set of camshaft positions and the second corresponding set of pressure values; and recalibrate the camshaft based on a comparison of the first camshaft signature and the second camshaft signature, wherein the recalibrating of the camshaft includes adjusting a rotation angle of the camshaft with respect to a crankshaft of the combustion engine.

* * * * *